United States Patent [19]

Normile et al.

[11] Patent Number: 5,212,742

[45] Date of Patent: May 18, 1993

[54] METHOD AND APPARATUS FOR ENCODING/DECODING IMAGE DATA

[75] Inventors: James O. Normile, Sunnyvale; Chia L. Yeh, Saratoga; Daniel W. Wright, Sunnyvale; Ke-Chiang Chu, Saratoga, both of Calif.

[73] Assignee: Apple Computer, Inc., Cupertino, Calif.

[21] Appl. No.: 705,284

[22] Filed: May 24, 1991

[51] Int. Cl.$^5$ .............................................. G06K 9/00
[52] U.S. Cl. ...................................... 382/56; 382/27; 382/41; 382/49
[58] Field of Search ....................... 362/27, 49, 56, 41; 340/752

[56] References Cited

U.S. PATENT DOCUMENTS

| | | | |
|---|---|---|---|
| 4,174,514 | 11/1979 | Sternberg | 382/49 |
| 4,484,349 | 11/1984 | McCubbrey | 382/49 |
| 4,665,556 | 5/1987 | Fukushima et al. | 382/49 |
| 4,684,997 | 8/1987 | Romzo et al. | 382/56 |
| 5,070,531 | 12/1991 | Schuerman et al. | 382/27 |

OTHER PUBLICATIONS

E. J. Delp, O. R. Mitchell, "Image Compression Using Block Truncation Coding," *IEEE Transactions on Communications*, vol. COM-27, No. 9, Sep. 1979, pp. 1335–1342.

G. Campbell, T. A. Defanti, et al., "Two Bit/Pixel Full Color Encoding," Proceedings of *SIGGRAPH '86*, vol. 20, No. 4, Aug. 18–22, 1986, pp. 215–223.

T. Murakami, K. Asai, et al., "Scene Adaptive Vector Quantization for Image Coding," *Globecom '88*, Nov. 28–Dec. 1, 1988, pp. 1068 ∝ 1072.

J. B. O'Neal, Jr., "Predictive Quantizing Systems for the Transmission of Television Signals," *Bell System Technical Journal*, May/Jun. 1966, pp. 689–721.

R. Plompen, Y. Hatori, et al., "Motion Video Coding in CCITT SG VS—The Video Source Coding," *Globecom '88*, Nov. 28–Dec. 1, 1988, pp. 0997–1004.

N. S. Jayant and P. Noll, *Digital Coding of Waveforms*, Prentice-Hall Signal Processing Series, p. 58.

A. N. Netravali and B. G. Haskell, *Digital Pictures: Representation and Compression*, Plenum Publishing Corp., 1988, pp. 31–34, 389–392, and 415–416.

A. N. Netravali and J. O. Limb, "Picture Coding: A Review," *Proceedings of the IEEE*, vol. 68, No. 3, Mar. 1980, pp. 366–406.

C. Chen, "Adaptive Transform Coding Via Quadtree-Based Variable Blocksize DCT," *ICASSP '89*, IEEE, May 23–26, 1989, pp. 1854–1857.

Specialists Group on Coding for Visual Telephony, *Draft Revision of Recommendation H.261*, Document No. 584, Nov. 10, 1989.

International Organisation for Standardization, *MPEG Video Simulation Model Three (SM3), Draft #1*, A Koster, PTT Research, 1990.

*Primary Examiner*—Michael T. Razavi
*Assistant Examiner*—Yon Jung
*Attorney, Agent, or Firm*—Blakely, Sokoloff, Taylor & Zafman

[57] ABSTRACT

An apparatus and method for processing video data for compression/decompression in real-time. The apparatus comprises a plurality of compute modules, in a preferred embodiment, for a total of four compute modules coupled in parallel. Each of the compute modules has a processor, dual port memory, scratch-pad memory, and an arbitration mechanism. A first bus couples the compute modules and a host processor. Lastly, the device comprises a shared memory which is coupled to the host processor and to the compute modules with a second bus. The method handles assigning portions of the image for each of the processors to operate upon.

16 Claims, 11 Drawing Sheets

Enhanced CCITT Decoder

METHOD AND APPARATUS FOR ENCODING/DECODING IMAGE DATA

BACKGROUND OF THE INVENTION

1. Field of the Invention

This invention relates to the field of video imaging systems. More specifically, this invention relates to an improved method and apparatus for video encoding/decoding.

2. Description of the Related Art

Due to the storage requirements, recent demands for full motion video in such applications as video mail, video telephony, video teleconferencing, image database browsing, multimedia, and other applications have required that standards be introduced for video compression. One image of 35 mm slide quality resolution requires 50 megabytes of data to be represented in a computer system (this number is arrived at by multiplying the horizontal by the vertical resolution by the number of bits to represent the full color range or 4096×4096×8×3 [R+G+B] 18=50,331,648 bytes). One frame of digitized NTSC (National Television Standards Committee) quality video comprising 720×480 pixels requires approximately one half megabyte of digital data to represent the image (720×480×1.5 bytes per pixel). In an NTSC system which operates at approximately 30 frames per second, digitized NTSC-quality video will therefore generate approximately 15.552 megabytes of data per second. Without compression, assuming a storage capability of one gigabyte with a two megabytes per second access rate, it is possible to:

a. store 65 seconds of live video on the disk and to play it back at 3 frames per second;

b. store 21 high quality still images taking 24 seconds to store or retrieve one such image.

Assuming that a fiber distributed data interface (FDDI) is available with a bandwidth of 200 megabits per second, 1.5 channels of live video can be accommodated, or 35 mm quality still images can be transmitted at the rate of one every two seconds. With currently available technology in CD-ROM, a likely distribution medium for products containing video, the current transfer rate is approximately 0.18 megabytes per second. 0.37 megabytes per second may be attained with CD-ROM in the near future.

For illustration, take the variable parameters to be the horizontal and vertical resolution and frame rate, and assume that 24 bits are used to represent each pixel. Let D represent the horizontal or vertical dimension and assume an aspect ratio of 4:3. The data rate in megabytes per second as a function of frame rate and image size is:

| Image Size | Frame Rate per second | | | | | |
| --- | --- | --- | --- | --- | --- | --- |
| D | 5 | 10 | 15 | 20 | 25 | 30 |
| 64 | 0.04 | 0.08 | 0.12 | 0.16 | 0.20 | 0.24 |
| 128 | 0.16 | 0.33 | 0.49 | 0.65 | 0.82 | 0.98 |
| 256 | 0.65 | 1.31 | 1.96 | 2.62 | 3.27 | 3.93 |
| 512 | 2.62 | 5.24 | 7.86 | 10.48 | 13.10 | 15.72 | or formulated in a slightly different way, the number of minutes of storage on a 600 megabyte disk is:

| Image Size | Frame Rate per second | | | | | |
| --- | --- | --- | --- | --- | --- | --- |
| D | 5 | 10 | 15 | 20 | 25 | 30 |
| 64 | 244.20 | 122.10 | 81.40 | 61.06 | 48.84 | 40.70 |
| 128 | 61.05 | 30.52 | 20.35 | 12.25 | 12.21 | 10.17 |
| 256 | 15.26 | 7.63 | 5.08 | 3.81 | 3.05 | 2.54 |
| 512 | 3.81 | 1.90 | 1.27 | 0.95 | 0.76 | 0.63 |

It is obvious from data rate and storage considerations that data compaction is required in order for full motion video to be attained.

In light of these storage and rate problems, some form of video compression is required in order to reduce the amount of storage and increase the throughput required to display full-motion video in a quality closely approximating NTSC. Photographic and, to an even greater degree, moving images generally portray information which contains much repetition, smooth motion, and redundant information. Stated in an equivalent way, areas of an image are often correlated with each other, as are sequences of images over time. Keeping these facts in mind, several techniques as have been established which eliminate redundancy in video imaging in order to compress these images to a more manageable size which requires less storage, and may be displayed at a fairly high rate. Some simple compression techniques include:

1. Horizontal and Vertical Subsampling: Sampling only a limited number of pixels horizontally or vertically across an image. The required reduction in resolution provides for poor quality images.

2. Reduction in Number of Bits Per Pixel: The technique including the use of a Color Look Up Table is currently used successfully to reduce from 24 to 8 bits per pixel. A reduction of approximately 3-1 is the useful limit of this method.

3. Block Truncation Coding and Color Cell Methods: The block truncation coding (BTC) was developed by Bob Mitchell in the early 1980's targeted at low compression rate and high quality applications (Robert Mitchell, et al., *Image Compression Using Block Truncation Coding*, IEEE Trans., Comm., pp. 1335-1342, Vol. Com-27, No. 9, Sep. 1979). In this scheme, the first order statistics (mean) and the second order statistics (variance) of each pixel block is extracted and transmitted. The image is reconstructed using these two quantities. An 8-1 compression ratio with 4×4 block sizes was demonstrated in (Graham Campbell, *Two Bit/Pixel Full Color Encoding*, pp. 215-223, Proceedings of SIGGRAPH '86, Vol. 20, No. 4, Aug. 1986).

4. Vector Quantization (VQ): A simple VQ maps discrete k-dimensional vectors into a digital sequence for transmission or storage. Each vector (a block of 4×4 or 3×3 pixels) is compared to a number of templates in the code book, and the index of the best matched template is transmitted to the receiver. The receiver uses the index for table look-up to reconstruct the image. A simple VQ could provide about 20-1 compression with good quality. A more complex VQ scheme has been demonstrated to provide similar quality to the CCITT (International Consultative Committee for Telephony & Telegraphy) DCT (Discrete Cosine Transformation) scheme recommendation H.261 (T. Murakami, *Scene Adaptive Vector Quantization for Image Coding*, Globecom, 1988).

5. Predictive Techniques: The assumption on which this family of methods relies is that adjacent pixels are correlated. As a consequence, data reduction can be accomplished by predicting pixel values based on their neighbors. The difference between the predicted and the actual pixel value is then encoded. An extensive body of work exists on this technique and variations on it (O'Neil, J. B., *Predictive Quantization Systems for Transmission of TV Signals*, Bell System Technical Journal, pp. 689–721, May/June 1966). The compression ratio to be expected from each of these simple methods is between four and eight to one.

More complex techniques for video compression are also known in the art. It is possible to achieve data compression of between four and eight to one by using some of the simpler techniques as mentioned above. To achieve comparable quality, at compression ratios from twenty to forty to one, involves a superlinear increase in complexity. In this case, it is no longer appropriate to consider the compression process as a simple one-step procedure.

In general, lossless compression techniques attempt to whiten or decorrelate a source signal. Intuitively, this makes sense in that a decorrelated signal cannot be compressed further or represented more compactly. For compression ratios of greater than twenty to one, a lossy element must be introduced somewhere into the process. This is usually done through a temporal or spatial resolution reduction used in conjunction with a quantization process. The quantization may be either vector or scalar. The quantizer should be positioned so that a graceful degradation of perceived quality with an increasing compression ratio results.

Many of the succeeding methods are complex, but may be broken into a series of simpler steps. The compression process can be viewed as a number of linear transformations followed by quantization. The quantization is in turn followed by a lossless encoding process. The transformations applied to the image are designed to reduce redundancy in a representational, spatial and temporal sense. Each transformation is described individually.

DECORRELATION

Although the RGB representation of digitized images is common and useful, it is not particularly efficient. Each one of the red, green and blue constituents is potentially of full bandwidth, although much of the information is correlated from plane to plane. The first step in the compression process is to decorrelate the three components. If an exact transformation were used, it would be image dependent, and as a consequence computationally expensive. A useful approximation which does not depend on image statistics is the following:

$$\begin{pmatrix} Y \\ U \\ V \end{pmatrix} = \begin{pmatrix} .3 & .59 & .11 \\ .6 & -.28 & -.32 \\ .21 & -.52 & .31 \end{pmatrix} \begin{pmatrix} R \\ G \\ B \end{pmatrix}$$

In the case of NTSC images, the resulting U and V (chrominance components containing color information) components are of lower bandwidth than the Y (luminance component containing the monochrome information). In general, the U and V components are of less perceptual importance than the Y component. The next stage in the compression process usually consists of subsampling U and V horizontally and vertically by a factor of two or four. This is done by low pass filtering followed by decimation. At this point in the process, much of the interplane redundancy has been removed, and a data reduction by a factor of two has been achieved.

REDUCTION OF TEMPORAL REDUNDANCY

Reduction of temporal redundancy may be achieved simply by taking the difference between successive frames. In the case of no motion and no scene change, this frame difference will be zero. The situation is more complex when there is interframe motion. In this case, some reregistration of the portions of the image which have moved is required prior to frame differencing. This is done by estimating how far pixels have moved between frames. Allowing for this movement, corresponding pixels are again subtracted (Ronald Plompen, et al., *Motion Video Coding in CCITT SG XV—The Video Source Coding*, pp. 997–1004, IEEE Global Telecommunications Conference, December 1988). The motion vectors are coded and transmitted with the compressed bit stream. These vectors are again used in the decoding process to reconstruct the images. The distinction between frame differencing and differencing using motion estimation may be expressed as follows. In the case of simple differencing, the error between frames is calculated as:

$$e(x,y,t) = f(x,y,t+1) - f(x,y,t)$$

using motion estimation error may be written as:

$$e(x,y,t) = f(x+\bar{x}, y+\bar{y}, t+1) - f(x,y,t)$$

where $\bar{x}$ and $\bar{y}$ are the calculated displacements in the x and y directions respectively.

REDUCTION OF SPATIAL REDUNDANCY

In most images, adjacent pixels are correlated. Reducing spatial redundancy involves removing this correlation. The removal is achieved using a linear transformation on the spatial data. In the ideal case, this transform should depend on image statistics. Such a transform does exist and is known as the Hotelling or Karhounen Loueve (KL) transform (N. S. Jayant, Peter Noll, *Digital Coding of Waveforms*, Prentice Hall, Signal Processing Series, p. 58). As it is computationally expensive and does not have a fast algorithmic implementation, it is used only as a reference to evaluate other transforms. A variety of other transforms have been applied to the problem, including: Fourier, Walsh, Slant, Haddamard (Arun, N. Netravali, Barry G. Haskell, *Digital Pictures Representation and Compression*, Plenum Press). The cosine transform provides the best performance (in the sense of being close to the KL transform). The discrete cosine transform is defined in the following way:

$$\theta(k,l) = \frac{a(k)a(l)}{2} \sum_{m=0}^{N-1} \sum_{n=0}^{N-1} \times (m,n) \cdot \cos\left(\frac{\pi k(2m+1)}{2N}\right) \cos\left(\frac{\pi k(2n+1)}{2N}\right)$$

where x(m,n) is an N×N field (Blocksize), k, l, m, n all range from 0 to N−1, and $$\alpha(0) = \frac{1}{\sqrt{2}};$$

$\alpha(j) = 1$; $j \neq 0$. A range of DCT "block sizes" have been investigated for image compression (A. Netravali, et al., *Picture Coding: A Review*, Proc. IEEE, pp. 366–406, March 1980), and standards bodies have decided, apparently in an arbitrary fashion, that 8×8 blocks are "best." Adaptive block size have also been considered, with the adaptation driven by image activity in the area to be transformed (see Chen, C.T., "Adaptive Transform Coding Via Quad-Tree-Based Variable Block Size," *Proceedings of ICASSP '89*, pp. 1854–1857). In summary, a combination of the above techniques, as applied to a raw video image would be performed as follows:
1. Digitizing the image;
2. transform RGB to YUV;
3. remove temporal redundancy (through frame differencing and motion compensation;
4. remove spatial redundancy (through a discrete cosine transfer); and
5. entropy encode the data (using Huffman coding).

This process yields the maximum compression possible using prior state of the art techniques.

COMPRESSION STANDARDS

Three examples of state of the art compression methods using some of these techniques are known as: CCITT H.261 (the International Consultive Committee for Telephony and Telegraphy); JPEG (Joint Photographers Experts Group); and MPEG (the Motion Picture Experts Group). The JPEG standard was developed for encoding photographic still images and sets forth a basic technique for encoding video image data. The technique converts 8×8 pixel blocks of the source image using a discrete cosine transformation (DCT) function, with each block of pixels being represented in YUV source format (representing luminance and chrominance information for the block). Threshold blocks of DCT coefficients using psychovisual thresholding matrices are then used to quantize the results of the 8×8 DCT macroblocks of the source image. Finally, each of the blocks is entropy encoded. The decoding process reverses these steps.

The CCITT H.261 standard was developed for use in video teleconferencing and video telephony applications. It can operate at 64 kilobits (Kbits) per second to 1.92 megabits (Mbits) per second, and can operate upon images between 525 and 625 lines based upon a common intermediate format (CIF). It is performed using a method as shown in FIG. 1.

The CCITT encoder 100 consists of a DCT, a zig-zag scanned quantization, and Huffman coding. DCT 101, quantizer 102, and variable length coding 103 blocks perform the coding function. Finally, multiplexer 104 combines the Huffman code from the variable length coding block 103, motion vector data from motion estimation block 105, quantizer data from quantizer block 102. Intra/Inter type information from intra/inter block 106 and performs formatting and serializing, video synchronization and block addressing. Frame memory 107 is used to determine differences from the previous frame and the current frame using motion estimation block 105. CCITT encoder 100 further comprises inverse quantizer 108 and inverse DCT function 109 to provide frame difference information. Lastly, information multiplexed by 104 is passed to rate control 111 and buffer 112 for output as compressed bit stream 120.

The CCITT decoder is shown in FIG. 2 as 200. Demultiplexing block 201 takes the encoded bit stream 210, identifies its constituents and routes them to the relevant parts of decoder 200. The main function of variable length decoding block 202 and inverse quantizer 203 block is to reconstruct the DCT coefficients from their Huffman encoded values, rescale these values and pass these on to inverse DCT block 204. Inverse DCT block 204 takes coefficients in blocks of 8×8 and reconstitutes the underlying spatial video information. If the macro block is intra-coded, no motion estimation is invoked. If it is inter-coded, the output is a difference between the information in this frame and the motion-compensated information in the last frame. A motion vector transmitted from demultiplexer 201 via "side information" signal 208 determines the best block to be used for reconstruction from the last frame. Motion compensation is performed by 206 from information of the current image in frame buffer 207. This is fed back into the decoded stream 205 and then as decoded output information 220 in CIF format. The Y and UV components share the same motion vector information. A detailed description of the CCITT H.261 standard is described in document No. 584, published on Nov. 10, 1989 by the Specialists Group on Coding For Visual Telephony, entitled *Draft Revision of Recommendation H.261* published by the CCITT SG XV Working Party XV/1 (1989).

The MPEG standard is the most recent compression specification to use transport methods which describe motion video. Though not fully finalized, the MPEG specification's goal is to obtain VHS quality on reconstruction of the images with a bit rate of approximately 1.15 megabits per second for video. This yields a total compression ratio of about 40-1. The distinguishing feature of MPEG from JPEG and CCITT H.261 is that MPEG provides a higher quality image than CCITT H.261, like JPEG but allows motion. This is in contrast to JPEG, which only provides still-frame imagery and no audio. In addition, MPEG adds the additional feature of synchronized sound along with the encoded video data although it has not been finalized. A detailed description of MPEG may be found in the document entitled *MPEG Video Simulation Model 3 (SM3)—Draft No. 1* published by the International Organization for Standardization ISO-IEC/JTC1/SC2/WG8, Coded Representation of Picture and Audio Information ISO-IEC/JTC1/SC2/WG8 N MPEG 90/, published by A. Koster of PTT Research.

Some of the relative advantages and disadvantages of the various coding algorithms are set forth as follows. JPEG provides no description of motion video at all. MPEG, although a full featured standard (it provides both forward motion, backwards motion, and still frame), is still under development and undergoing revision. CCITT H.261, because it was developed for teleconferencing and video telephony, it provides a moving source but has no provisions for viewing the motion picture images in a reverse direction, or provides any means for still frame viewing. Therefore, a system is required which is fairly mature, such as the CCITT H.261 standard, but yet provides all the capabilities (including reverse play and still frame) of a full-featured compression system, such as the MPEG standard.

CCITT H.261 uses a scheme such as that shown in FIG. 3 in order to provide for full-motion video. FIG. 3 shows a series of frames which represents a particular section of moving video. 301 and 302 contain full scene information for the image at the beginning of a series of frames. 301 and 302 are known as "intra" frames or keyframes which are used in CCITT H.261. Each intra frame 301 or 302 contains a full scene description of the frame at the times they appear. Although compressed, intra frames 301 and 302 contain substantial information. Each of the intervening frames between two intra frames 301 and 302 are known as "inter" frames 303, 304, and 305. Each inter frame such as 303-305 contains information which should be added to the preceding frame. For example, inter frame 303 only contains information which has moved since intra frame 301. Therefore, the information represented in frames 303-305 may be substantially less than that contained in frames 301 and 302 because the inter frames contain only motion data, and not complete scene information for the entire frame. This provides a fairly high compression ratio for intervening inter frames 303-305. CCITT H.261 as represented in FIG. 3 is incapable of providing reverse motion video because a "key" frame, such as intra frame 301 only establishes information for inter frames 303-305 which follow intra frame 301 in time. In other words, 303-305 only contain information which has moved from intra frame 301, not motion information from intra frame 302. An attempt to play such a sequence of frames in reverse will generate substantial distortion of the moving image.

Because a decompression rate of approximately 30 frames per second (FPS) is required for real-time moving video, the processor performing the decoding process must have a fairly high bandwidth and be able to handle all the necessary matrix-matrix multiply operations required by the decoding process in a short period of time. To date, no single device possesses the necessary computing power to decompress an incoming compressed bit stream at the necessary rate to make data available for NTSC quality video at the 30 frame per second rate.

SUMMARY AND OBJECTS OF THE INVENTION

One of the objects of the present invention is provide an architecture and method which has sufficient computing power to allow compressed moving video images to be decompressed and displayed in real time.

This and other objects of the present invention are provided for by an apparatus for processing video data for compression/decompression in real-time which comprises a plurality of compute modules, in a preferred embodiment, for a total of four compute modules coupled in parallel. Each of the compute modules has a processor, dual port memory, scratch-pad memory, and an arbitration mechanism. In a preferred embodiment, the processor is a digital signal processor, and the device comprises 16 kilobytes of dualport dynamic random access memory and 64 kilobytes of local "scratch pad" dynamic random access memory. A first bus couples the compute modules and a host processor. In a preferred embodiment, the host processor is coupled to a complete computer system comprising a display, memory, and other peripherals, and the first bus is known as a control bus which operates at a relatively low speed. Lastly, the device comprises a shared memory which is coupled to the host processor and to the compute modules with a second bus. This second bus is known in a preferred embodiment as a "video" bus and operates at substantially higher speeds than the "control" bus. The shared memory, in a preferred embodiment, comprises two megabytes of static random access memory to allow access by both the compute modules via the video bus, and the host processor, the access being controlled by the arbitration mechanism in a first in first out order (FIFO), which arbitration mechanism is a gate array, or other discrete circuitry in a preferred embodiment. In an alternative embodiment, there is a frame buffer coupled to the "video" bus, and a display means coupled to the frame buffer, which acts as the display of the system, instead of that normally connected to the host. This provides increased performance of the system as a whole, especially in video decompression tasks.

These and other objects of the present invention are provided for by a method in a computer system for partitioning an image for processing by a parallel computing system. The parallel computing system comprises N computing units. First, the total length of an image is determined, and is divided by N. The dividend is then stored in a first value, the first value, in a preferred embodiment, the width of the image to be assigned to each parallel computing unit. A first region of the image is assigned to a first computing unit, the first region starting at a first position, and ending at the first position offset by the first value. Therefore, a portion of the image is assigned, in a preferred embodiment which is the full image in width, and H/N wherein H is the length or height of the image, and N is the total number of processors. Each of the N processors are assigned corresponding sections of the image according to their position relative to the first processor, each having a section which is the full width of the image, and which is H/N in length. Height and width information is represented, in the preferred embodiment, in blocks containing luminance and chrominance information.

BRIEF DESCRIPTION OF DRAWINGS

The present invention is illustrated by way of example and not limitation in the figures of the accompanying in which like references indicate like elements and in which.

DETAILED DESCRIPTION OF THE PREFERRED EMBODIMENT

The present invention relates to a method and apparatus for video encoding/decoding. In the following description, for the purposes of explanation, specific values, signals, coding formats, circuitry, and input formats are set forth in order to provide a thorough understanding of the present invention. It will be apparent, however, to one skilled in the art, the present invention may be practiced without these specific details. In other instances, well known circuits and devices are shown in block diagram form in order to not unnecessarily obscure the present invention.

A portion of the disclosure of this patent document contains material which is subject to copyright protection. The copyright owner has no objection to the facsimile reproduction by any one of the patent disclosure, as it appears in the Patent and Trademark Office patent files of records, but otherwise reserves all copyright rights whatsoever.

Figure 4:
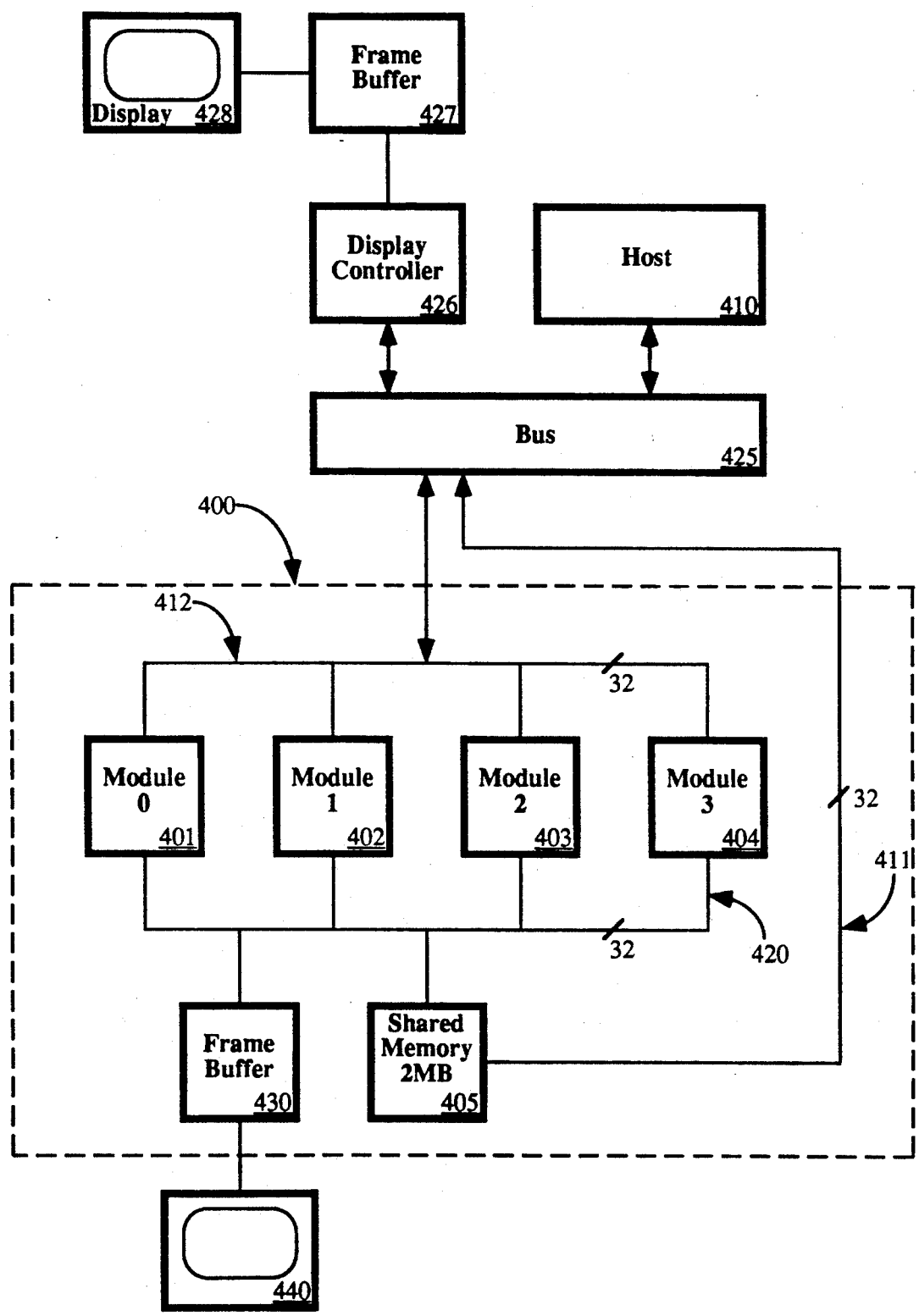
FIG. 4 shows the architecture of the video processor of the preferred embodiment.

Referring to FIG. 4, an architecture of a parallel processing system which is used for compression/decompression of moving video images in the preferred embodiment is shown as 400. The architecture of the preferred embodiment provides a parallel coupling of multiple video processing modules such as 401-404 which has the necessary bandwidth to decompress video images at the frame rates required by motion video (for instance, 30 frames per second). Modules 401-404 are coupled to a computer system bus 425 via control bus 412 in the preferred embodiment. Also, coupled to system bus 425 is display controller 426, which is coupled to frame buffer 427. Frame buffer 427 in turn is coupled to display 426 for displaying information. In the preferred embodiment, information is placed onto bus 425 by modules 401-404 or host processor 410, and read in by display controller 426 for placing into frame buffer 427 and display on 428. Although host processor 410, in the preferred embodiment, is typically the bus master of system bus 425, at certain times display controller 426 assumes control of system bus 425. Display controller 426 can increase the typical throughput on bus 425, to allow uncompressed data to be received from modules 401-404 and placed into frame buffer 427 in the required time. In the preferred embodiment, display controller 426 is an AMD 29000 RISC processor manufactured by Advanced Micro Devices of Sunnyvale, Calif. Host processor 410 is one of the 68000 family of microprocessors such as the 68030 or 68020 manufactured by Motorola, Inc. of Schaumburg, Ill. System 400 shown in FIG. 4 is implemented in a computer system such as one of the Macintosh ® family of personal computers for example the Macintosh ® II, manufactured by Apple ® Computers, Inc. of Cupertino, Calif. (Apple ® and Macintosh ® are registered trademarks of Apple Computer, Inc. of Cupertino, Calif.). System bus 425 is a standard computer system bus capable of operating at 10 MHz which is well-known to those skilled in the art and is capable of transferring data at a maximum rate of approximately 18 Mbytes per second.

System 400 of the preferred embodiment provides a shared memory space 405 which comprises two megabytes (approximately 512,000 entries of 32 bit longwords) of static random access memory (SRAM). Shared memory 405 is coupled to bus 425 via signal lines 411 and is further coupled to high speed "video" bus 420. Video bus 420 may transfer data at a maximum rate of approximately 80 megabytes per second and is clocked at 20 MHz. Control bus 411 transfers data at a maximum rate of ten megabytes per second and is clocked at 10 MHz. Shared memory 405 is separated into two distinct areas. Two banks of equal size are provided in 405 for high data rate ping-ponging between host information and information put into the shared memory by computing modules 401-404.

In addition, memory 405 comprises a small mail box area for communication and task synchronization between host 410 and computing modules 401-404. The mailbox area may vary in length depending on the job size and ranges from one longword (32 bits) to the entire length of memory 405. Although only four parallel computing units 401-404 are set forth in the preferred embodiment, more or less than four parallel processing units may be used along with the corresponding increase or decrease in computing power associated with the addition or the loss of each computing module.

Computing modules 401, 402, 403, and 404 are also connected to a "low" speed control bus 412 which is coupled to each of the computing modules and bus 425 for communication between the computing modules and task synchronization with host processor 410. In addition, in an alternative embodiment, a separate frame buffer 430 may be directly coupled to the video bus 420, which frame buffer may then be then be coupled to a display such as 440 shown in FIG. 4. Although, in the preferred embodiment, the display capabilities of display controller 426, frame buffer 427 and display 428 would normally be used for displaying information processed by modules 401-404, in an alternative embodiment, 430 and 440 may be used by each module 401-404 depositing uncompressed data directly into frame buffer 430 for display. A more detailed representation of one of the computing modules such as 401-404 is shown in FIG. 5.

Figure 1:
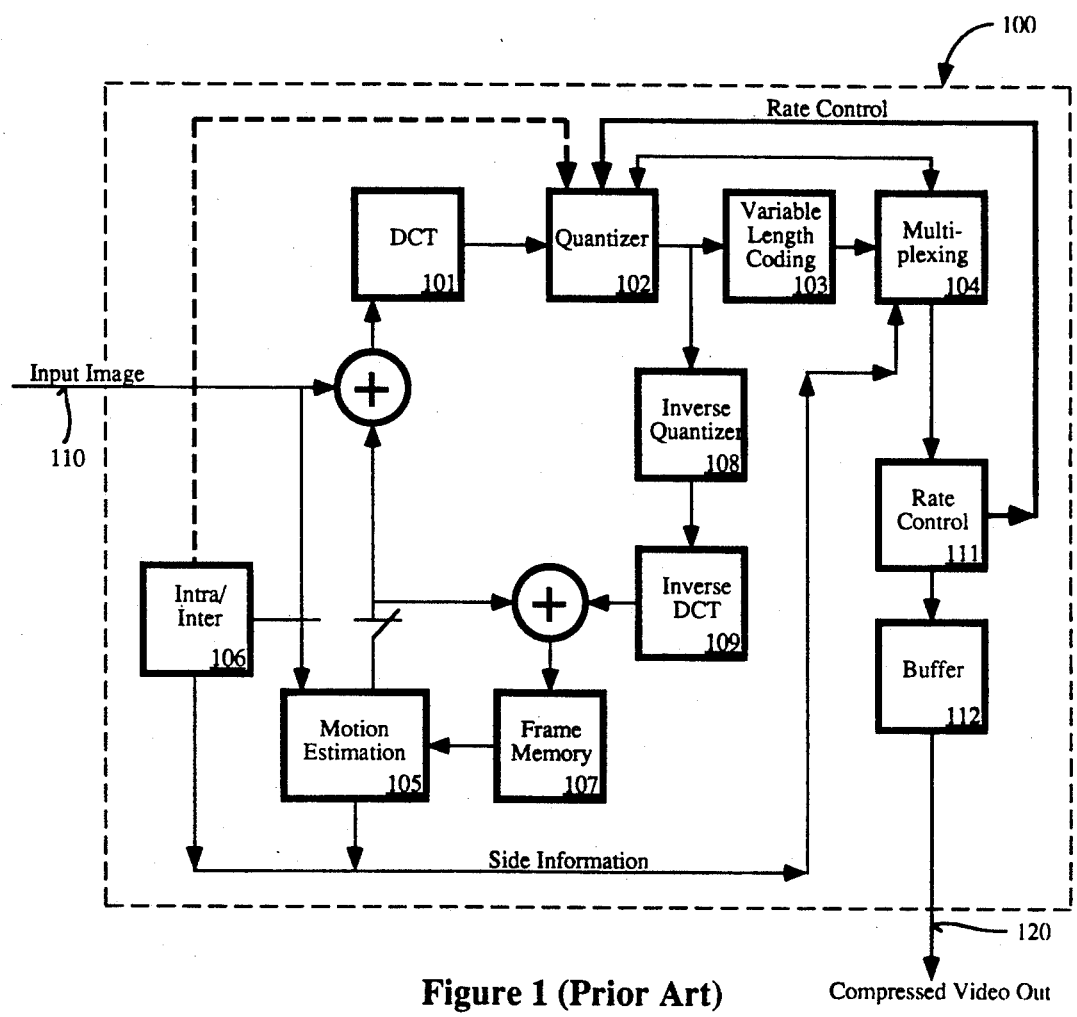
FIG. 1 shows a prior art video encoder.
Figure 2:
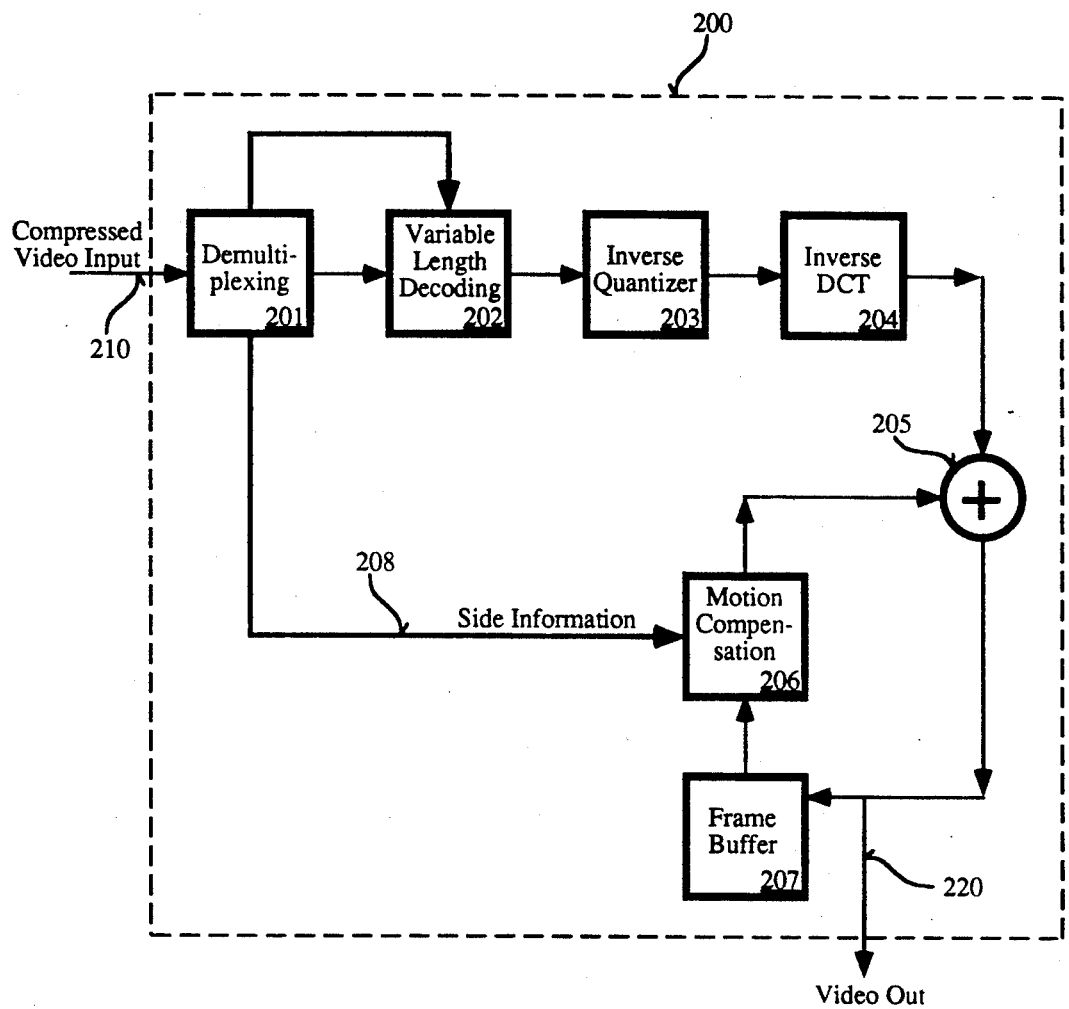
FIG. 2 shows a prior art video decoder.
Figure 5:
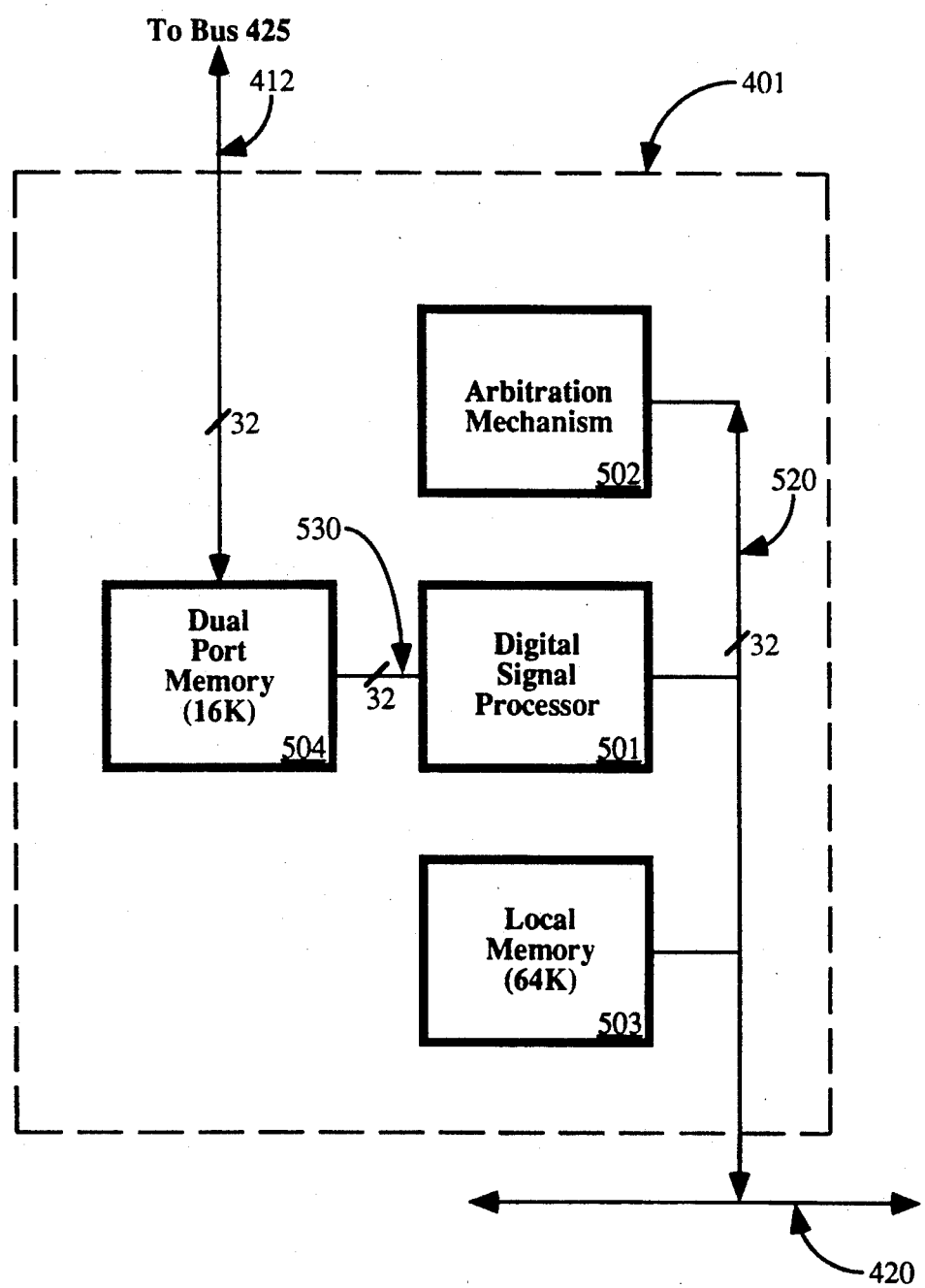
FIG. 5 shows one compute module used in the preferred embodiment of the present invention.

FIG. 5 is a block diagram of one compute module 401 of the system shown in FIG. 4. Because the remaining compute modules are essentially identical (except for codes embedded in arbitration mechanism 502 to provide their unique identification), only compute module 401 is described in FIG. 5. The structure of module 401 has equal application to each of the remaining compute modules such as 402-404 shown in FIG. 4. Each compute module such as 401 comprises 16 kilobytes (approximately 4,000 32-bit longwords) of dual-port random access memory 504 as shown in FIG. 5. Dual-port memory 504 is coupled to control bus 412 for communication between computing module 401 and devices over bus 425 such as host 410 and display controller 426. Dual-port memory 504 is further coupled to internal bus 530 which is coupled to digital signal processor 501 of compute module 401. Digital signal processor (DSP) 501 provides all processing of data and communication between the various portions of compute module 401. DSP 502 provides the encoding and decoding functions of video data which were discussed with reference to FIGS. 1 and 2. DSP 501, as discussed above, is coupled to dual-port memory 504 through internal bus 530. 530 is a full 32-bit wide data bus and provides communication to host 410 through dual-port memory 504. DSP 501 is further coupled to an internal high speed bus 520 for communication with arbitration mechanism 502 and local memory 503. In the preferred embodiment, 501 is a TMS 320C30 digital signal processor manufactured by Texas Instruments (TI) of Dallas, Tex. Digital signal processor 501 is coupled to local memory 504 via local bus 520. Local memory 503 provides a working or scratch pad memory for the various processing operations performed by DSP 501. Local memory 503 comprises 64 kilobytes of dynamic random access memory (or approximately 16,000 32-bit longwords).

In addition, DSP 501 is coupled to arbitration mechanism 502 through local bus 520. Arbitration mechanism 502 provides circuitry to grant compute module 401 access to shared memory 405 as shown in FIG. 4 over bus 420. Each of the computing modules 401–404 and host processor 410 has a unique identification number in arbitration mechanism 502 shown in FIG. 5. Requests and grants of access to shared memory 405 are performed as follows. The arbitration provided by this logic, allows access to the shared memory and host processor in first-in-first-out (FIFO) order according to each device's bus request (BRQ) number. Host 410 has a bus request number of BRQ0. Access is obtained when bus acknowledge (BACK) is issued. However, if simultaneous requests are made after reset by compute modules 401–405 and host 410, then host 410 gets priority, and obtains access to shared memory bus 405. Compute module 401 is second in priority (BRQ1), module 402 is third (BRQ2), module 403 is fourth (BRQ3), and module 404 is last (BRQ4). In an alternative embodiment, host processor 410 may be given interrupt capability wherein operations being performed by computing modules 401–404 are preempted by host processor 410. In a preferred embodiment, arbitration mechanism 502 is implemented in a gate-array device. The code for this arbitration scheme is set forth in appendix I.

In the preferred embodiment, decompressed data is read by display controller 426 from parallel processing system 400 and transmits the data as uncompressed image data to frame buffer 427. Essentially, display controller 426 when accessed to dual port memory 504 in each of the computing modules 401–404 is available, display controller 426 assumes control of system bus 425 thus becoming the bus master. When display controller 426 becomes the bus master, uncompressed data is read from modules 401–404 and each of their respective dual port memories 504, and that information is placed onto bus 425. Once display controller 426 assumes control of bus 425, data may be transferred on bus 425 at the maximum possible rate allowed by the bus. In the preferred embodiment, the rate is approximately 18 megabytes per second. At that time, host 410 does not participate in the data transfer at all. Once the information is received over bus 425 from modules 401–404, that information is passed to frame buffer 427. Thus, the frame becomes available for display 428 at screen refresh time. The enhanced capabilities of display controller 426 allows the uncompressed data to be available from each of the modules 401–404 at the required 30 fps rate to display 428. Once the entire frame has been made available in frame buffer 427, display controller 426 relinquishes control of bus 425 to host 410. Then, the next cycle of retrieving compressed data and transmitting it to computing modules 401–404 may be performed. In the preferred embodiment, host 410 is required for reading compressed data from disk or memory, transferring the data to modules 401–404, and for servicing user requests.

Figure 6:
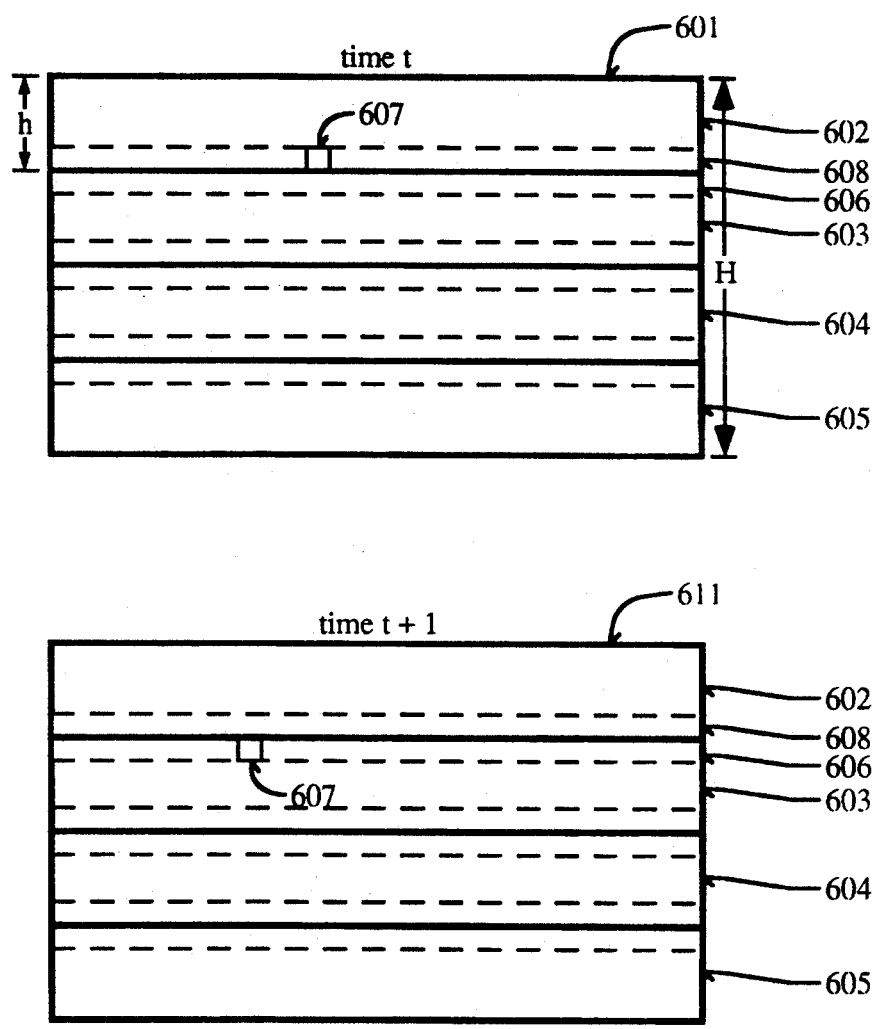
FIG. 6 shows the partitioning of an image for processing by each of the computing modules of the preferred embodiment.

In order for computing modules 401–404 to decode compressed input image data, the task must be split into component parts to allow each processor to independently process the data. In one scheme, for moving video data where there are N processors, every Nth frame may be assigned to a separate processor. This scheme is not desirable because data from a preceding frame is required to compute the new frame in most decompression algorithms, such as CCITT H.261 and MPEG. Therefore, the preferred embodiment uses a scheme such as that set forth in FIG. 6. The task of splitting this decompression problem into components for each of the computing nodes 401–404 is shown and discussed with reference to FIG. 6. Task synchronization between host 410 and modules 401–404 is discussed in more detail below. An image such as 601 which is displayed at time t is divided into a number of horizontal "stripes" 602, 603, 604, and 605 each of which is assigned to a separate parallel computing node such as 401–404. If 601 is viewed as one complete image or frame, then module 401 will be assigned stripe 602 for processing. Module 402 receives stripe 603, module 403 receives 604, and module 404 receives stripe 605 of the frame for processing. The stripe width is the full screen width of frame 601 shown in FIG. 6, and the stripe length is represented as h wherein h=H/N. H is the total length of the frame and N is the number of parallel computing nodes in video imaging system 400. In addition, each parallel computing node is assigned an image overlap area such as 606 for stripe 602 that overlaps with the next processor stripe such as 603. This allows certain areas of stripes to be shared between computing modules, so that a vertically moving area such as 607 may already be in the local memory of the next processor if the area transitions from one stripe to another. For instance, as shown in FIG. 6, at time t, a moving area 607 in frame 601 may move at time t+1 as shown in frame 611 to a second position which is now in stripe 603. This stripe is handled by the next computing module 402 and already resides in that node's local memory because 607 resided in overlap area 608 at time t. Area 608 was the overlap area for stripe 603, which was assigned to computing module 402. Therefore, at time t+1 for image 611 shown in FIG. 6, computing module 402 will have image data for 607 available in its local memory 503 due to the presence of 607 in overlap area 608 at time t of image 601.

In addition to this frame partitioning scheme, each processor has access to the remainder of the image through shared memory 405 discussed with reference to FIG. 4. The allocation scheme discussed with reference to FIG. 6 will generally provide immediate access to data in vertically overlapping areas through local memory 503 of each computing module. If information is required by the computing module that is outside its stripe, (i.e. a moving area has vertically traversed outside the "overlap" areas, and therefore is not in local memory) then the information may be retrieved from shared memory 405 shown in FIG. 4. This, of course, is achieved at a higher performance penalty because the arbitration mechanism must allow access and delays may occur over bus 420 while accessing shared memory 405. Using this partitioning scheme, each computing module performs inverse DCT, motion compensation and YUV (luminance/chrominance) to RGB functions independently of the other processing modules.

Task synchronization between host 410 and modules 401–404 is now discussed. The preferred embodiment employs a scheme wherein one module such as 401, 402, 403, or 404 is the "master". Once per frame, the master will request host 410 to place in dual port RAM 405 one complete frame of compressed data. The master then decodes the compressed data into "jobs" for individual slave modules, and posts them into shared memory 405.

The 512K longwords in shared memory 405 are logically divided into two areas called "job banks." In each bank resides a stack of "jobs" for individual slave modules. At any given time, the stack of jobs in one bank is being built up by newly decoded jobs being "posted" there by the master. Multiplexed in to the sequence of shared memory accesses initiated by master module 401, 402, 403, or 404 to post jobs there will be memory accesses by slaves which pop jobs off from the other stack. Once master module 401, 402, 403, or 404 has decoded and posted as jobs a complete video frame, and the slaves have entirely emptied the other job bank, the roles of the two banks flip, and the process begins again. Then, via block read operations, display controller 426 reads the data available in the dual port memory 504 for each module 401-404 over bus 425, and the reconstructed image information is placed into frame buffer 427.

The amount of computation needed to decode the original compressed file into "jobs" for the slaves is quite small when compared with the amount of subsequent calculation required to then process these jobs into completed areas of the final image. With four or fewer processors, the master module will almost always complete its decoding of the present frame before the slaves have emptied the other job banks. The master then reverts to the function of a slave, and joins the other slaves in finishing the remaining jobs. The result is that all available modules can be continuously employed until the frame is complete. A slave process will only fall idle under the circumstances that:
1. its last job is finished;
2. there are no remaining jobs for the frame; or
3. there are other slaves which have yet to finish their last jobs.

Since one job typically represents only 1/60 of the decode of the entire frame, it can be seen that decompression will be accomplished within the required time to be available to display controller 426, or frame buffer 430.

In each cycle through its main event loop, host 410 makes a circuit through all modules 401-404 and reads status registers. If a module has posted a task for host 410 (such as a request to input a frame of compressed data), host 410 takes the specified action, and continues.

The 4K longwords of dual port RAM 504 which is shared between host 410 and each module 401-404 is (logically) divided into two banks. This allows DSP 501 of each module 401-404 to be filling one bank in parallel with host 410 unloading the other into a frame buffer coupled to host 410. Alternatively, data may become available to frame buffer 430 which is accessed directly by modules 410-404. The rolls of the two banks can then be flipped when both processes are finished.

The preferred embodiment also provides a means for using reverse playback and still frame imagery using the CCITT H.261 compression standard. It will be appreciated by one skilled in the art, however, that this technique may be applied to other types of video compression such as MPEG or JPEG. As discussed previously, under CCITT H.261, forward motion video is made possible by the establishment of certain key or "intra" frames which establish the beginning of a scene. The frames following the "intra" frame and before the next "intra" frame, are known as "inter" frames which contain movement information for portions of the image. In other words, an inter frame only contains information for parts of the frame that has moved and that information is added to the intra frame information contained in frame buffer 430. However, because the "key" or "intra" frames only provide establishing information for the beginning of a scene, reverse playback is impossible, and an attempt to play an encoded image in reverse results in severe image distortions. The technique used for providing reverse playback and still frame in the preferred embodiment is shown and discussed with reference to FIG. 7a.

Figure 3:
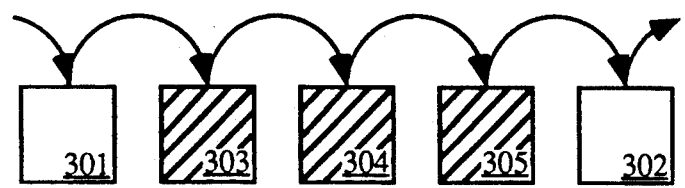
FIG. 3 shows a prior art scheme for representing motion video.
Figure 7A:
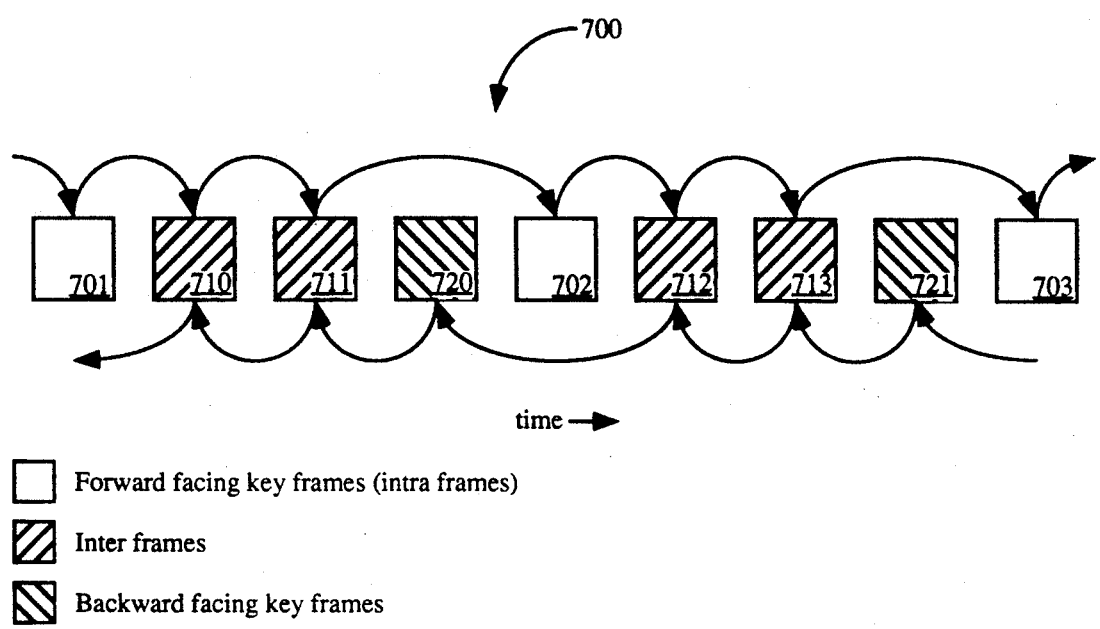
FIG. 7a shows the preferred embodiment's method of encoding motion video.

As shown in FIG. 7a, a particular series of frames, such as 700, may contain, as in the prior art discussed with reference to FIG. 3, several "forward facing" keyframes or "intra" frames 701, 702, and 703. Each of these keyframes provides complete scene information for the image at those particular points in time. In addition, there are several "inter" frames between the "intra" frames such as 710, 711, 712, and 713. Each of the "inter" frames provides motion information for image data which has moved since the last "intra" frame. The inter frames are added to the intra frame data contained in the frame buffer. For instance, 710 and 711 contain information that has changed since intra frame 701. Also, 712 and 713 contain motion information for parts of the image that has changed since intra frame 702. In the preferred embodiment, a series of images 700, however, also contains two extra frames 720 and 721, 720 and 721 are "additional" keyframes which have been added to images 700 to provide the reverse playback and still frame features. These additional keyframes establish a complete scene information in the reverse direction. In other words, 721 will establish complete scene information for the time, in a reverse direction, just prior to frames 713 and 712. While playing in a reverse direction, 721 will set the complete scene information of the image, and 713 will contain information which can be subtracted from keyframe 721, 712, in turn, contains information which has changed since inter frame 713, and can be subtracted from the image in the frame buffer. The same is true for backward facing keyframe 720 and its corresponding inter frames 711 and 710.

One distinguishing feature to note is that backward-facing keyframes 720 and 721 are ignored while playback is done in the forward direction. In other words, the additional keyframes are present in the sequence of compressed images, however, when played in the forward direction, keyframes 720 and 721 are skipped. This is because only intra frames 701, 702, and 703 are valid in the forward direction. Conversely, forward facing keyframes 701, 702, and 703 are skipped when the images are displayed in the reverse direction. Pointers are present in each of the frames 700 to point to the next frame in the sequence depending on the direction of play. In brief, pointers in the forward direction skip backward keyframes 720 and 721, and pointers in the reverse direction skip forward keyframes 701, 702, and 703. This is discussed in more detail below. In the reverse direction, only keyframes 721 and 720 are used to establish scene information from which inter frames are subtracted.

Figure 7B:
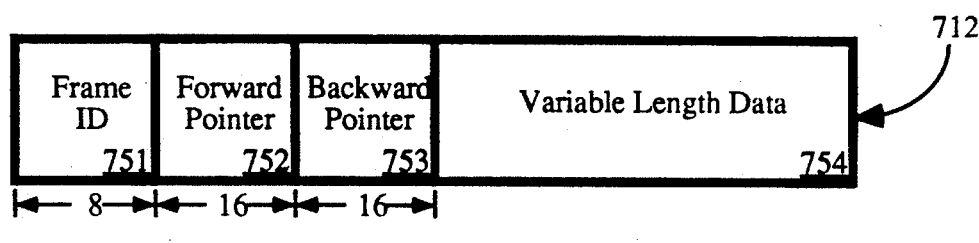
FIG. 7b is a detailed representation of one frame in the preferred embodiment.

The enhanced CCITT encoder provides an additional keyframe where every forward facing keyframe appears, but this additional keyframe contains information which is only used for reverse play. The addition of the extra keyframe consumes approximately five percent more overhead in the computing of the additional keyframes. This is not considered significant, in light of the advantages provided by the reverse playback feature A more detailed representation of a datum for a frame used in the preferred embodiment is shown in FIG. 7b. FIG. 7b shows "inter" frame 712 for the purposes of discussion, however, the discussion is equally applicable to the forward facing keyframes (intra frames) such as 701, 702, and 703 shown in FIG. 7a, and the backward facing keyframes such as 720 and 721 shown in FIG. 7a. As shown in FIG. 7b, a datum such as 712 contains three fields 751, 752, and 753 which provide information about the data contained within the frame. The first field, 751, is eight bits in length and known as a "frame ID" field. It contains a value indicating the type of frame. If the frame is an intra or forward-facing keyframe such as 701, 702, or 703, the frame ID field 751 contains zero. If, however, the frame is an inter frame such as 710, 711, 712, or 713 shown in FIG. 7a, then the frame ID contains one. Frame ID field 751 will contain two if the frame is a backward-facing keyframe such as 720 or 721 as provided by the preferred embodiment. The values 3 through 255 are currently undefined, therefore, the decoder of the preferred embodiment will ignore frames containing a frame ID field 751 with a value between 3 and 255, inclusive.

The next fields in the enhanced CCITT frame such as 712 shown in FIG. 7b, are the forward pointer 752 and the backward pointer 753. These fields merely provide linkage information for forward and reverse play. Reverse keyframes will be skipped for field 752 and forward keyframes (intra frames) will be skipped using field 753. In an intra frame such as 712 shown in FIG. 7a, the forward pointer 752 will point to frame 713, and the backward pointer will point to backward facing keyframe 720 as shown in FIG. 7a. Backward pointer 753 will point to other intra frames, such as 711 pointing to frame 710 shown in FIG. 7a, another inter frame precedes it in time. The remaining field in the datum such as 712 in FIG. 7b is variable length data field 754. This contains the appropriate variable length coding data for the frame. In the case of an intra frame such as 712 shown in FIG. 7a, the variable length data contains difference information from the previous frame such as 702 shown in FIG. 7a. For intra frames such as 701, 702, or 703, or backward facing keyframes such as 721 or 720, complete scene information is contained within the variable length data field 754.

Figure 8A:
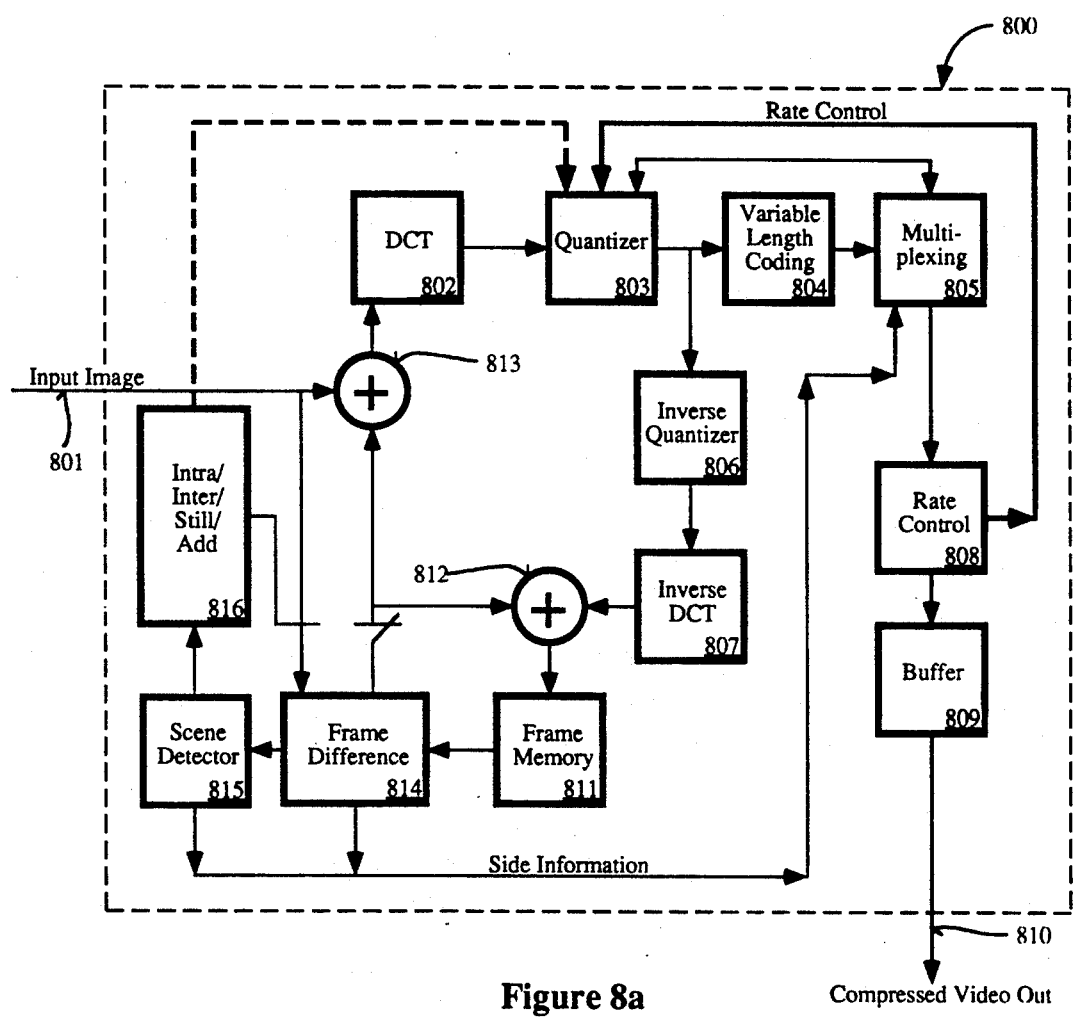
FIG. 8a shows the improved CCITT encoder used in the preferred embodiment.

The enhanced CCITT decoder is shown and discussed with reference to FIG. 8a. FIG. 8a shown a standard CCITT decoder with additional functional blocks added. Where the unmodified CCITT encoder comprised a motion estimation and intra-inter function blocks, the enhanced CCITT decoder 800 contains a frame difference block 814, a scene detector block 815, and a intra/inter/still/add block 816. Even though motion compensation is desirable because it removes more redundancy than frame differencing, it is very expensive in computing overhead. It is easier to implement the reverse playback feature using frame differencing. Scene detector block 815 automatically detects the difference in the energy off chrominance between successive frames. Also, block 815 detects scene changes and whether still images are present in the sequence of video images. Upon a scene change, key (intra) frames are added to the sequence to improve quality Block 815 decides whether the intra, inter, still, or "additional" frame (reverse keyframe) mode should be invoked. The additional frame mode is added to provide the necessary keyframe for reverse playback as discussed with reference to FIG. 8a. The frame difference block 814 takes the difference of consecutive frames rather than motion compensation to enable the reverse playback. Because there is no motion compensation as is provided in the forward direction, the quality of the image during compression and decompression is slightly degraded, however, this is acceptable considering the added features of reverse play and still frame along with the performance of CCITT H.261, which is adequate for many applications.

Figure 8B:
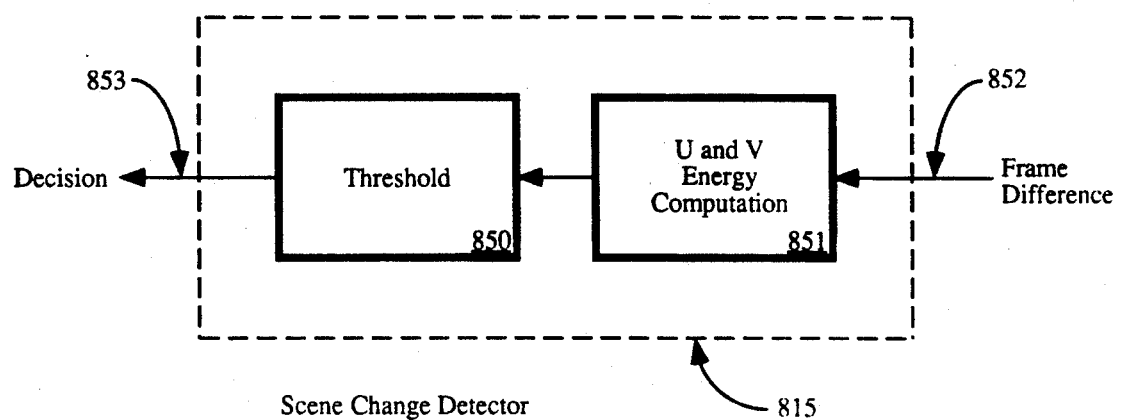
FIG. 8b is a detailed representation of the scene change detector of the preferred embodiment.

A more detailed representation of scene change detector 815 is shown in FIG. 8b. Scene change detector 815 takes difference information 852 received from frame difference block 814 on FIG. 8a and determines whether the difference from the previous frame is sufficient to warrant computation of an entirely new intra frame by block 816. This is determined by function 851, by computing the U and V (chrominance) energy contained within information 852 received from frame difference block 814. In an alternative embodiment, scene change detection may be keyed on luminance only, or both luminance and chrominance energy. Once the U and V information has been determined, that information is fed into a threshold block 850 which determines whether the U and V signals difference information has reached a predefined threshold. If the signal has reached this threshold, a signal is sent to block 816 shown in FIG. 8a to indicate that an entirely new intra or key frame must be computed for the input image to preserve the quality of the sequence. This indicates that the difference between the previous frame and the current frame is so great that entire scene information should be generated (an intra frame) instead of scene difference information contained in an inter frame. Therefore, the quality of the image and thus the sequence of moving images may be maintained. This information, which is sent to block 816 shown in FIG. 8a is output as information 853 shown in FIG. 8b.

Figure 9:
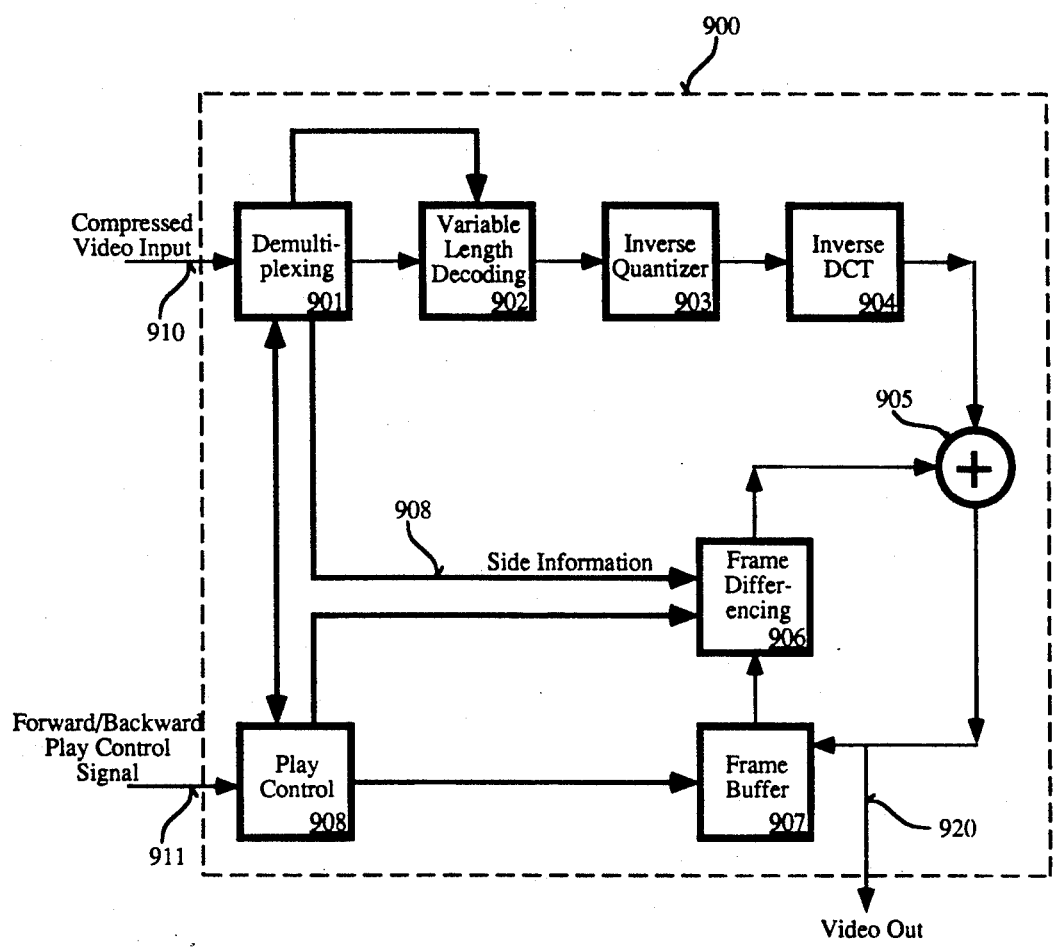
FIG. 9 shows the enhanced CCITT decoder used in the preferred embodiment.

The enhanced CCITT decoder which is used in the preferred embodiment is shown in FIG. 9. 900 as shown in FIG. 9 contains all the functions of the standard CCITT decoder, except that an additional block "play control" 908 is present to facilitate backwards and forwards play. Also, motion compensation block 206 has been replaced by frame differencing block 906 which performs the frame differencing for the uncompressed data depending on whether forward or reverse play is taking place. If forward play is taking place, then frame differencing block 906 merely adds inter frame data to the current data residing in the frame buffer. If reverse play is taking place, then frame differencing block 906 subtracts inter frame data from the current data residing in the frame buffer. Frame differencing block 906 and demultiplexing block 901 are controlled by play control block 908 which indicates to the decoder 900 whether forward or reverse play is taking place. Play control 908 is controlled by an external signal forward/backward play control signal 911 which is activated by user interaction on an input device such as a keyboard, mouse, or other input device.

Thus, an invention for improved video decompression has been described. Although this invention has been described particularly with reference to a preferred embodiment as set forth in FIGS. 1-9, it will be apparent to one skilled in the art that the present invention has utility far exceeding that disclosed in the figures. It is contemplated that many changes and modifications may be made, by one of ordinary skill in the art, without departing from the spirit and the scope of the invention as disclosed above.

APPENDIX I module arbiter
title 'Multi c30 arbitration state machine
© Apple Computer
"Four-station arbitration control logic, allowing four users sharing one resource.

```
ARB        device 'F105';
    Clk,PR    pin 1,19;
    IBRQ0,IBRQ1,IBRQ2,IBRQ3,IBRQ4,IBRQ5,IBRQ6,IBRQ7    pin
2,3,4,5,6,7,8,9;
    CTRL0,CTRL1,CTRL2,CTRL3,CTRL4,CTRL5,CTRL6,CTRL7    pin
20,21,22,23,24,25,26,27;
    BACK0,BACK1,BACK2,BACK3,BACK4,BACK5,BACK6,BACK7    pin
10,11,12,13,15,16,17,18;
    "F0,F1,F2,F3,F4,F5,F6,F7    pin 10,11,12,13,15,16,17,18;
    sreg        = [P5,P4,P3,P2,P1,P0]; "State Registers
    H,L,Ck,X    = 1, 0, .C., .X.;

"define states
    "START=^b 111111;
    "WAIT0=^b 011111;
    "WAIT1=^b 111110;
    "WAIT2=^b 111101;
    "WAIT3=^b 111100;
    "WAIT4=^b 111011;
    "GRANT0=^b 000110;
    "GRANT1=^b 000111;
    "GRANT2=^b 001110;
    "GRANT3=^b 001111;
    "GRANT4=^b 010110;
    START=^b 111111;
    WAIT0=62;
    WAIT1=61;
    WAIT2=60;
    WAIT3=59;
    WAIT4=58;
    GRANT0=57;
    GRANT1=56;
    GRANT2=55;
    GRANT3=54;
    CLEANUP=53;
    ERR3=52;
    ERR4=[1,1,0,0,X,X];
    ERR5=[1,0,X,X,X,X];
    ERR6=[0,X,X,X,X,X];
equations
    [P5.AP,P4.AP,P3.AP,P2.AP,P1.AP,P0.AP]=PR;
    [BACK0.AP,BACK1.AP,BACK2.AP,BACK3.AP,BACK4.AP,BACK5.AP,
        BACK6.AP,BACK7.AP]=PR;
    state_diagram sreg;
State START:
    IF(BRQ0) THEN GRANT0 WITH BACK0.R:=1;
    IF(BRQ1&IBRQ0) THEN GRANT1 WITH BACK1.R:=1;
    IF(BRQ2&IBRQ1&IBRQ0) THEN GRANT2 WITH BACK2.R:=1;
```

IF(BRQ3&IBRQ2&IBRQ1&IBRQ0) THEN GRANT3 WITH BACK3.R:=1;
State WAIT0:
 IF(BRQ0) THEN GRANT0 WITH BACK0.R:=1;
 IF(BRQ1&IBRQ0) THEN GRANT1 WITH BACK1.R:=1;
 IF(BRQ2&IBRQ1&IBRQ0) THEN GRANT2 WITH BACK2.R:=1;
 IF(BRQ3&IBRQ2&IBRQ1&IBRQ0) THEN GRANT3 WITH BACK3.R:=1;
State WAIT1:
 IF(BRQ1) THEN GRANT1 WITH BACK1.R:=1;
 IF(BRQ2&IBRQ1) THEN GRANT2 WITH BACK2.R:=1;
 IF(BRQ3&IBRQ2&IBRQ1) THEN GRANT3 WITH BACK3.R=1;
 IF(BRQ0&IBRQ3&IBRQ2&IBRQ1) THEN GRANT0 WITH BACK0.R=1;
State WAIT2:
 IF(BRQ2) THEN GRANT2 WITH BACK2.R=1;
 IF(BRQ3&IBRQ2) THEN GRANT3 WITH BACK3.R=1;
 IF(BRQ0&IBRQ3&IBRQ2) THEN GRANT0 WITH BACK0.R=1;
 IF(BRQ1&IBRQ0&IBRQ3&IBRQ2) THEN GRANT1 WITH BACK1.R=1;
State WAIT3:
 IF(BRQ3) THEN GRANT3 WITH BACK3.R=1;
 IF(BRQ0&IBRQ3) THEN GRANT0 WITH BACK0.R=1;
 IF(BRQ1&IBRQ0&IBRQ3) THEN GRANT1 WITH BACK1.R=1;
 IF(BRQ2&IBRQ1&IBRQ0&IBRQ3) THEN GRANT2 WITH BACK2.R=1;
State GRANT0:
 IF(IBRQ0) THEN WAIT1 WITH BACK0:=1;
State GRANT1:
 IF(IBRQ1) THEN WAIT2 WITH BACK1:=1;
State GRANT2:
 IF(IBRQ2) THEN WAIT3 WITH BACK2:=1;
State GRANT3;
 IF(IBRQ3) THEN WAIT0 WITH BACK3:=1;
State ERR6:
 GOTO CLEANUP;
State ERR5:
 GOTO CLEANUP;
State ERR4:
 GOTO CLEANUP;
State ERR3:
 GOTO CLEANUP;
State CLEANUP;
 GOTO WAIT0 WITH BACK0:=1
    BACK1:=1
    BACK2:=1
    BACK3:=1;

"After Preset, clocking is inhibited until a High-to-Low clock transition.

test_vectors ([Clk,PR,CTRL7,BRQ0,BRQ1,BRQ2,BRQ3,BRQ4] ->
[sreg,BACK0,BACK1,BACK2,BACK3])
 [ 1 , 1, 0,L,L,L,L,L ] -> [START, X,X,X,X];" Power-on Preset
 [Ck, 0, 0,L,L,L,L,L ] -> [START,X,X,X,X];
 [Ck, 0 , 0,H,L,L,L,L ] -> [GRANT0,L,X,X,X];
 [Ck ,0 , 0,H,L,L,L,L ] -> [GRANT0,L,X,X,X];
 [Ck ,0 , 0,H,L,L,L,L ] -> [GRANT0,X,X,X,X];
 [Ck , 0 ,0,H,L,L,L,L ] -> [GRANT0,X,X,X,X];
 [Ck , 0, 0,L,L,L,L,L ] -> [WAIT1,X,X,X,X];
 [Ck , 0, 0,L,H,L,L,L ] -> [GRANT1,X,X,X,X];
 [Ck , 0, 0,L,L,L,L,L ] -> [WAIT2,X,X,X,X];
 [Ck , 0, 0,L,L,H,L,L ] -> [GRANT2,X,X,X,X];
 [Ck , 0, 0,L,L,L,L,L ] -> [WAIT3,X,X,X,X];
 [Ck , 0, 0,L,L,L,H,L] -> [GRANT3,X,X,X,X];

```
[Ck,0,0,H,L,L,L,L] -> [WAIT0,X,X,X,X];
[Ck , 0, 0, H,L,L,L,L] -> [GRANT0,X,X,X,X];
[Ck , 1,0, L,L,L,L,L] -> [START,X,X,X,X];
[Ck , 0,0, H,L,L,L,L] -> [GRANT0,X,X,X,X];
end
```

What is claimed is:

1. A method in a video display system of partitioning an image for processing by N processing units coupled in parallel to an input means for receiving said image, said image of dimensions of H rows and W columns, comprising the following steps:
   a. initializing an index variable i;
   b. assigning an ith horizontal region of said image in the input means to an ith processing unit, said ith region starting at a ith starting position and ending at the ith starting position offset by a partition length value of H/N, said ith region comprising W columns, and H/N and an overlap number of complete rows, said overlap number of rows being shared with a next processor, and
   c. incrementing said index variable i and repeating step b if said index variable i is less than N.

2. The method of claim 1 wherein the ith region of said image is assigned to a ith processing means, said processing means comprising a processor, a local memory and a means for receiving said ith region of said image.

3. The method of claim 1 wherein each of said regions comprises blocks of luminance and chrominance information.

4. The method of claim 1 wherein said processing comprises compressing said image.

5. The method of claim 1 wherein said image comprises one in a plurality of images.

6. The method of claim 5 wherein said processing comprises compressing said plurality of images.

7. The method of claim 5 wherein said processing comprises decompressing said plurality of images.

8. The method of claim 1 wherein said processing comprises decompressing said image.

9. A method in a video display system of partitioning an image for processing by N processing units coupled in parallel to an input means for receiving said image, comprising the following steps:
   a. assigning an ith horizontal region of said image in the input means to an ith processing unit, said ith region starting at a ith starting position and ending at the ith starting position offset by a partition length value of H/N, said ith region comprising W columns and H/N number of complete rows; and
   b. incrementing said index variable i and repeating step a if said index variable i is less than N.

10. The method of claim 9 wherein said ith region further comprises an overlap area which is shared with a i+1 processing unit.

11. The method of claim 9 wherein the ith region of said image is assigned to a ith processing means, said processing means comprising a processor, a local memory and a means for receiving said ith region of said image.

12. The method of claim 9 wherein each of said regions comprises blocks of luminance and chrominance information.

13. The method of claim 9 wherein said processing comprises said image.

14. The method of claim 9 wherein said image comprises one in a plurality of images.

15. The method of claim 9 wherein said processing comprises compressing said plurality of images.

16. The method of claim 9 wherein said processing comprises decompressing said image.

* * * * *